No. 722,803. PATENTED MAR. 17, 1903.
G. S. BOZARTH.
SUNSHADE ATTACHMENT FOR VEHICLES.
APPLICATION FILED MAY 20, 1902.
NO MODEL.
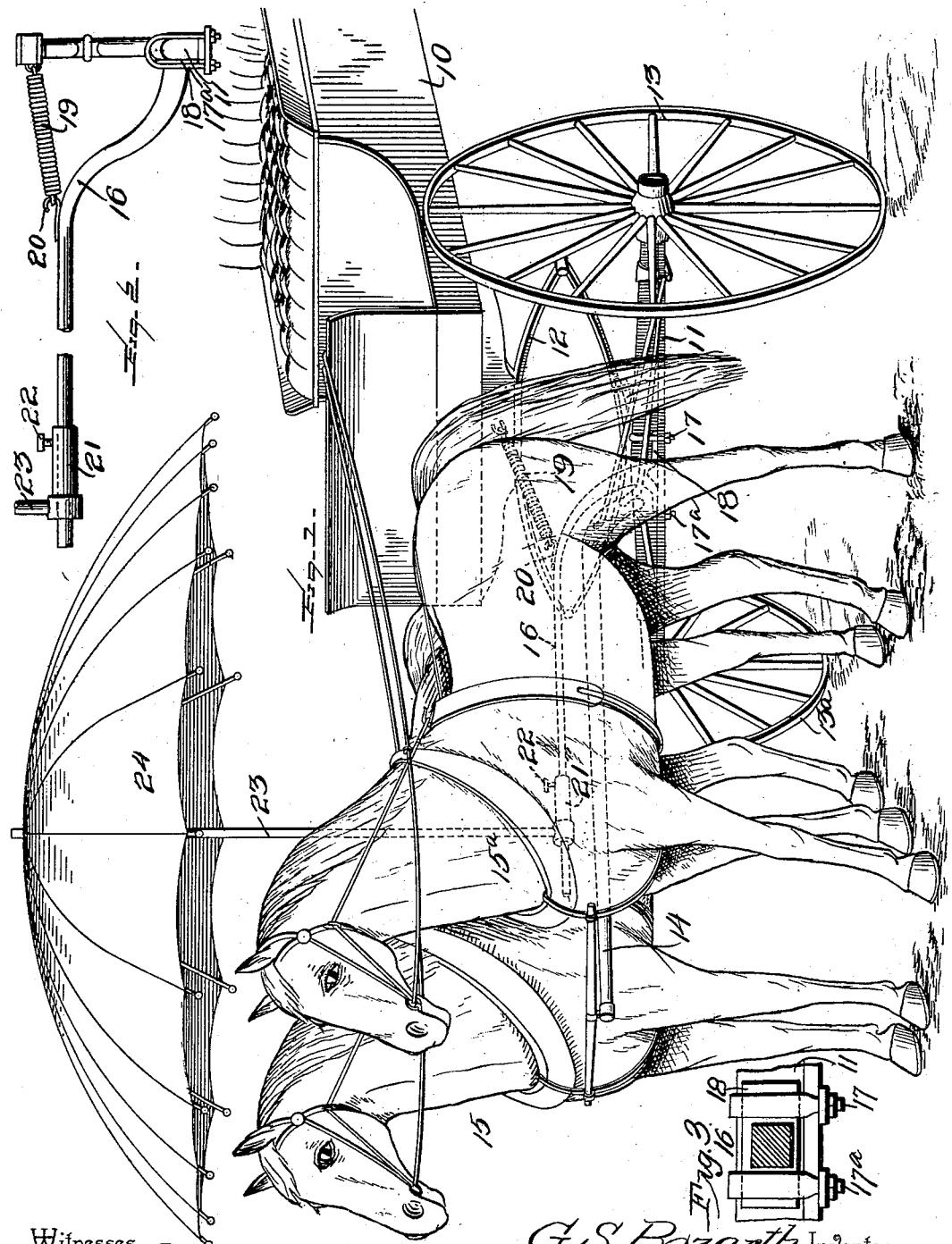
Witnesses
Wm. F. Doyle.
C. N. Woodward.
G. S. Bozarth, Inventor
by C. A. Snow & Co.
Attorneys

United States Patent Office.

GEORGE S. BOZARTH, OF CRESTON, IOWA.

SUNSHADE ATTACHMENT FOR VEHICLES.

SPECIFICATION forming part of Letters Patent No. 722,803, dated March 17, 1903.

Application filed May 20, 1902. Serial No. 108,243. (No model.)

*To all whom it may concern:*

Be it known that I, GEORGE S. BOZARTH, a citizen of the United States, residing at Creston, in the county of Union and State of Iowa, have invented a new and useful Sunshade Attachment for Vehicles, of which the following is a specification.

This invention relates to sunshade-supports adapted to be attached to a vehicle in a position to support the sunshade over the horses; and the invention consists in a support attached to the running-gear and extending over the tongue of the vehicle independently of the tongue and provided with an adjustable support for a sunshade.

Other novel features of the invention will be disclosed in the annexed description and be specified in the claim following.

In the drawings illustrative of the invention, Figure 1 represents a team of horses and a portion of a carriage with the sunshade-support attached thereto. Fig. 2 is a detail side elevation of the device attached to the forward running-gear. Fig. 3 represents a detail view showing the end of the shade-supporting rod, which is adapted for attachment to the vehicle-axle.

The device may be attached to any form of vehicle, generally those to which two or more horses are hitched, but may be applied with slight modifications to a vehicle having only one horse. It may be applied to carriages, wagons, or to the numerous horse-operated agricultural machines, grading-machines, or any other appliance employing horses as a draft means.

For the purpose of illustration the invention is shown applied to an ordinary carriage, 10 representing the body portion, 11 representing the forward axle connected to the body portion by the usual spring 12, and the axle provided with the usual wheels 13 13ª. The tongue is indicated at 14 and will be attached in the usual manner to the forward axle. The horses are indicated at 15 15ª in the usual position upon opposite sides of the tongue.

The invention which is the subject of the present application consists of a supporting-rod 16, connected rigidly to the forward axle 11, preferably by clips 17 17ª, engaging a T-head 18 upon the vehicle end of the rod 16. This T-head, which may consist of a metallic plate suitably secured to the rear end of the supporting-rod, extends laterally from the latter, as will be seen most clearly in Fig. 3 of the drawings, and is adapted to lie flat against the front side of the forward axle 11, so as to be engaged by the clips 17 and 17ª, as will be clearly seen in said figure. By this construction the device is capable of being attached to the axle at any desired point thereof and to form a firm support for the sunshade. The rod 16 is curved upward and outward above the tongue 14 and will be spaced from the tongue 14 a sufficient distance to permit the latter free play beneath it and so as not to interfere with the free movement of the vehicle-tongue. A spring 19 will connect the supporting-rod 16 to the running-gear of the vehicle, preferably above the spring 12, when the device is employed upon spring-vehicles, but which will be attached to any suitable part of the running-gear or framework at a suitable distance above the rod 16 to support it yieldably and form an elastic brace for preventing the snapping of the rod 16, which is rigidly connected to the axle of the vehicle. The lower end of the spring 19 will preferably be detachably connected to the rod 16 by a hook 20, so that the spring may be easily detached. This forms a yieldable support between the rod and the running-gear, so that the depression of the spring 12 or the lateral movement of the tongue 14 and the rotative movement of the axle upon its ring-bolt will not exert undue strains upon the rod 16 and cause it to snap. Adjustably disposed upon the outer end of the rod 16 is a sleeve 21, adapted to be adjustably connected to the rod, as by a set-screw 22, so that the sleeve may be adjusted longitudinally of the rod. Rising from the sleeve 21 is a standard 23, the standard supporting a sunshade 24 of any approved shape, preferably in the form of an umbrella, and collapsible upon the standard in the usual manner. The standard 23 will be arranged detachable from the sleeve, if required.

The sunshade portion 24 may be of any desired shape or size and either collapsible, like an umbrella, or in the form of a rigid fabric-covered framework, but will preferably be formed collapsible, as indicated.

The supporting-rod 16 will be constructed, preferably, to conform somewhat with the tongue of the vehicle to which it is attached and will be of any suitable material, either wood or metal, or partially of wood and partially of metal, suitably braced and supported.

By this simple device ample protection from heat, snow, or rain is afforded the team without adding materially to the weight of the vehicle and at a very slight increase of expense.

Having thus described my invention, what I claim is—

The combination with a vehicle, of a sunshade-supporting rod provided at its rear end with a T-head engaging the front side of the forward axle, clips connecting said T-head with the axle, and a supporting-spring.

In testimony that I claim the foregoing as my own I have hereto affixed my signature in the presence of two witnesses.

GEORGE S. BOZARTH.

Witnesses:
L. V. STRYKER,
SCOTT ARMSTRONG.